United States Patent
Morris (10) Patent No.: US 10,509,773 B2
(45) Date of Patent: Dec. 17, 2019

(54) DBFS WITH FLASHBACK ARCHIVE

(71) Applicant: Oracle International Corporation, Redwood Shores, CA (US)

(72) Inventor: Michael Morris, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 376 days.

(21) Appl. No.: 14/609,265

(22) Filed: Jan. 29, 2015

(65) Prior Publication Data

US 2016/0224550 A1  Aug. 4, 2016

(51) Int. Cl.
*G06F 16/18* (2019.01)
*G06F 16/9032* (2019.01)

(52) U.S. Cl.
CPC ...... *G06F 16/1873* (2019.01); *G06F 16/9032* (2019.01)

(58) Field of Classification Search
CPC ........... G06F 17/3023; G06F 17/30126; G06F 11/1448; G06F 8/71; G06F 17/30377; G06F 17/30174; G06F 17/30348; G06F 8/61; G06F 16/1873
See application file for complete search history.

(56) References Cited

U.S. PATENT DOCUMENTS

| | | | | |
|---|---|---|---|---|
| 4,658,351 A * | 4/1987 | Teng | ................ | G06F 9/4881 718/103 |
| 6,192,377 B1 * | 2/2001 | Ganesh | ............... | G06F 16/2329 |
| 6,278,452 B1 * | 8/2001 | Huberman | ........ | G06F 17/30126 706/48 |
| 6,308,173 B1 | 10/2001 | Glasser | | |
| 6,813,640 B1 | 11/2004 | Benson | | |
| 7,036,149 B2 | 4/2006 | Sonoda | | |
| 7,185,192 B1 | 2/2007 | Kahan | | |
| 7,685,123 B1 | 3/2010 | Thompson | | |
| 7,925,751 B1 | 4/2011 | Bolinger | | |
| 8,015,165 B2 * | 9/2011 | Idicula | ................ | G06F 16/2458 707/695 |
| 2005/0223008 A1 | 10/2005 | Kubota | | |
| 2006/0167979 A1 * | 7/2006 | Fuchs | ............... | G06F 17/30902 709/203 |

(Continued)

OTHER PUBLICATIONS

Morris, U.S. Appl. No. 14/543,658, filed Nov. 17, 2014, Interview Summary, dated Jun. 7, 2017.

(Continued)

*Primary Examiner* — Etienne P Leroux
(74) *Attorney, Agent, or Firm* — Hickman Palermo Becker Bingham LLP (57) ABSTRACT

A method for generating a query for version information on a file stored a database file system that is managed by a database server. When a client on a remote client machine sends a file operation request, the database management system, receives the file operation request and creates a database query for the requested file operation and an additional query for a set of version identifiers that identify the previous versions of the requested file of the requested file operation. The database management system executes the queries and generates a set of version identifiers, where each identifier from the set of version identifiers represents a specific version of the requested file at a particular point in time in the past.

21 Claims, 4 Drawing Sheets

(56) References Cited

U.S. PATENT DOCUMENTS

| | | | |
|---|---|---|---|
| 2006/0287999 A1* | 12/2006 | Kawabata | G06F 17/30126 |
| 2007/0083566 A1* | 4/2007 | Krishnaswamy | G06F 16/2379 |
| 2007/0150525 A1* | 6/2007 | Idicula | G06F 17/3023 |
| 2007/0185931 A1* | 8/2007 | Stokes | G06F 17/30067 |
| 2008/0005195 A1* | 1/2008 | Li | G06F 16/1837 |
| 2008/0046480 A1* | 2/2008 | Lou | G06F 17/30348 |
| 2009/0043907 A1 | 2/2009 | Peterson | |
| 2009/0319501 A1* | 12/2009 | Goldstein | G06F 17/30427 |
| 2010/0125510 A1* | 5/2010 | Smith | G06Q 20/105 705/17 |
| 2010/0242096 A1 | 9/2010 | Varadharajan | |
| 2010/0306171 A1* | 12/2010 | Antos | G06F 11/1448 707/638 |
| 2010/0325710 A1 | 12/2010 | Etchegoyen | |
| 2011/0145198 A1* | 6/2011 | Dickson | G06F 17/3023 707/648 |
| 2011/0225128 A1* | 9/2011 | Jarrett | G06F 8/61 707/692 |
| 2012/0233668 A1 | 9/2012 | Leafe | |
| 2012/0297363 A1* | 11/2012 | Perisic | G06F 8/71 717/122 |
| 2012/0297375 A1* | 11/2012 | Burke, Jr. | G06F 8/65 717/173 |
| 2013/0091108 A1* | 4/2013 | Mucklow | G06F 17/3023 707/695 |
| 2014/0025633 A1* | 1/2014 | Namini | G06F 16/21 707/610 |
| 2014/0282900 A1 | 9/2014 | Wang | |
| 2014/0310769 A1 | 10/2014 | O'Neill | |
| 2016/0140354 A1 | 5/2016 | Morris et al. | |
| 2017/0249328 A1* | 8/2017 | Liang | G06F 16/182 |

OTHER PUBLICATIONS

Morris, U.S. Appl. No. 14/543,658, filed Nov. 17, 2014, Notice of Allowance, dated Sep. 21, 2017.

* cited by examiner

DBFS WITH FLASHBACK ARCHIVE

CROSS-REFERENCE TO RELATED APPLICATIONS; BENEFIT CLAIM

This application is related to application Ser. No. 14/543,658 filed on Nov. 17, 2014 entitled "DBFS Permissions Using User, Role, and Permissions Flags", by Michael Morris, the entire disclosure of which is hereby incorporated by reference as if fully set forth herein.

This application is related to application Ser. No. 10/866,333 filed on Jun. 10, 2004 entitled "Querying Past Versions of Data in a Distributed Database", by Bipul Sinha and Amit Ganesh, the entire disclosure of which is hereby incorporated by reference as if fully set forth herein.

FIELD OF THE INVENTION

The present invention relates to providing file version information for files stored in a database file system.

BACKGROUND

Database Management Systems (DBMS) are used to store files closely associated with database applications including CAD, medical images, invoice images, and other documents. A database provides security, ability to search, and scalability over traditional file systems. A database file system (DBFS) leverages the features of a Database Management System to store files, and the strength of a DBMS to efficiently manage relational data. The DBFS provides a client-server file system abstraction over files stored in a database allowing users to perform network file system operations within the database using standard file system interfaces instead of standard database interfaces. Similar to a Network File System (NFS), the DBFS provides a transparent abstraction layer of a shared network file system as a local file system to a client user.

The DBMS is the file system server for DBFS. A DBFS Client provides a set of interfaces that transform file system operation requests from the client to database operation requests, which are then sent to the DBMS.

The DBFS file system is mounted on a client machine at a client-specific mount point. File system operation requests from a client-user that are relative to the client-specific mount point are translated by the DBFS Client to their corresponding database operation requests and sent to the DBMS. Certain industries, such as Pharmaceuticals and Finance, require the need to track a chain of custody for data files. Tracking the chain of custody must be maintained over network drives and/or data repositories and must maintain privileges on files and validate specific network storage devices. Such change management services may require significant overhead to track all changes to data.

Tracking changes within a DBMS involves either regularly backing up the state of data or tracking each specific change before committing the data change to disk. Retrieving the changes made over specific time on a specific file within the DBMS requires constructing a complex database query to retrieve the state of the file at a specified point in time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches are provided herein for a database file system (DBFS) to generate a query for version information of a file stored in a database that is managed by a Database Management System.

In the approaches a DBFS client on a remote client machine sends a file operation request. Once the DBMS receives the file operation request, the DBMS creates a database query for the requested file operation and an additional query for a set of version identifiers that identify the previous versions of the requested file from the requested file operation. The DBMS executes the queries and generates a set of version identifiers, where each identifier from the set of version identifiers represents a specific version of the requested file at a particular point in time in the past.

The additional query for the set of version identifiers is a specific query designed to retrieve metadata related to archive information for previous file versions. In order to execute the additional query, the DBFS tables managed by the DBMS implement a transaction-based archiving mechanism for the specific database objects within the DBFS tables. The transaction-based archiving mechanism used is able to track changes to database objects in order to retrieve prior temporal states of those database objects.

Database File System Architecture

Figure 1:
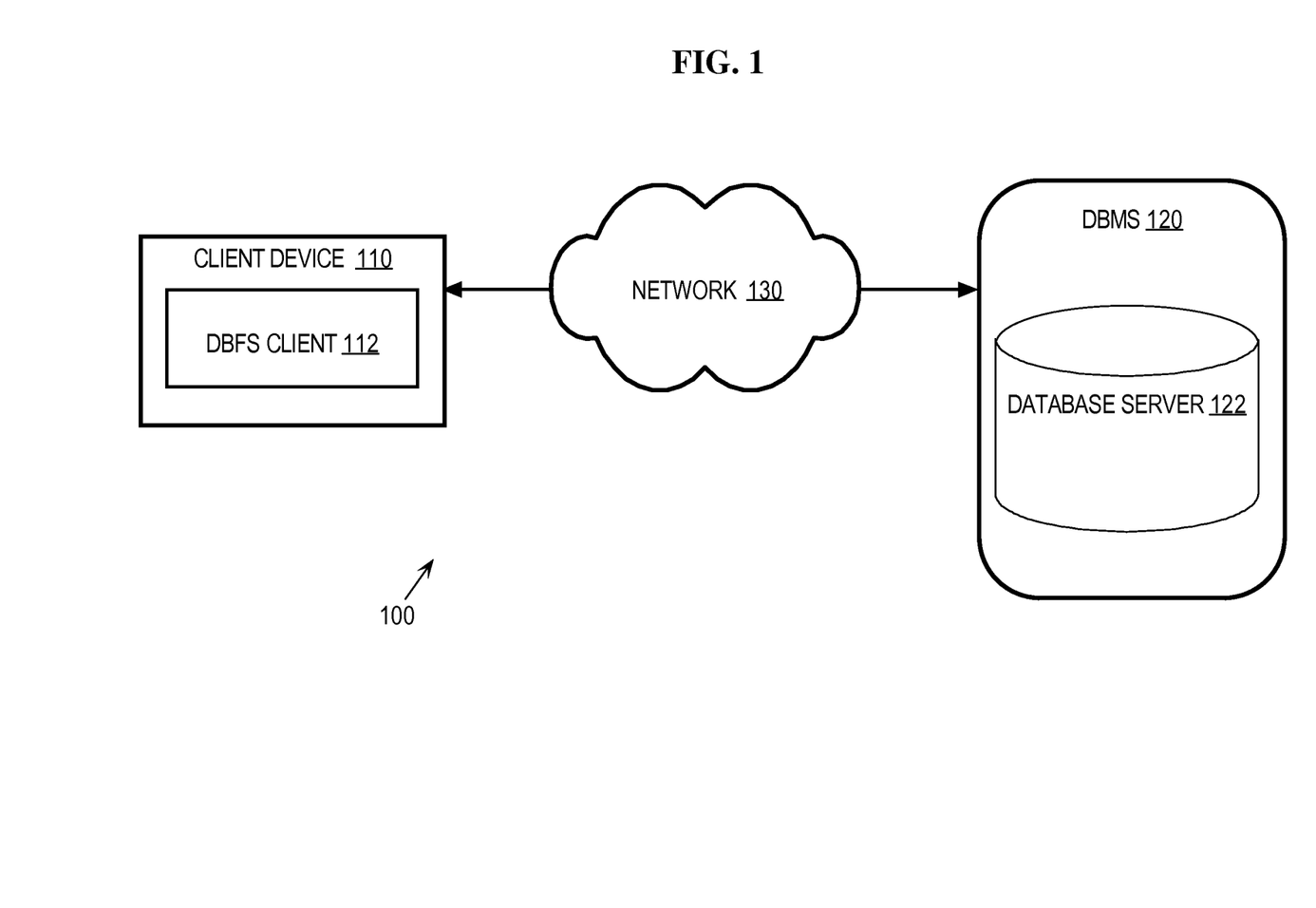
FIG. 1 is a block diagram that depicts an example network arrangement for a database file system receiving file operation requests from a client system.

FIG. 1 is a block diagram that depicts an example network arrangement 100 for the DBFS to send file operation requests from the client based upon the client's database credentials, according to embodiments. Example network arrangement 100 includes a client device 110 and a DBMS 120 communicatively coupled via a network 130. An example network arrangement 100 may include other devices, including multiple client devices and multiple server devices, according to embodiments.

The client device 110 may be implemented by any type of computing device that is communicatively connected to network 130. Example implementations of the client device 110 include, without limitation, workstations, personal computers, laptop computers, personal digital assistants (PDAs), tablet computers, cellular telephony devices such as smart phones, and any other type of computing device.

In the example network arrangement 100, the client device 110 is configured with a DBFS Client 112. The DBFS Client 112 may be implemented in any number of ways, including as a stand-alone application running on the client device 110. The DBFS Client 112 may be implemented by one or more logical modules. An example of the DBFS Client 112 is described in the DBFS OVERVIEW section below. The client device 110 may be configured with other mechanisms, processes and functionalities, depending upon a particular implementation to interact with the DBFS Client 112.

The DBMS 120 is the file system server for the DBFS. An example of the DBMS 120 is described in the DBMS OVERVIEW section below. The file system server consists of one or more file system stores that are accessed by a set of interfaces called DBFS Content API. A file system store is characterized by one or more database objects including, but not limited to, tables, table partitions, and indexes. The DBFS Content API provides database interfaces that correspond to a set file system access primitives including, but not limited to, create file, open, read, write, create directory, list directory, and change directory.

Embodiments of the DBFS Client 112 may use different mechanisms including but not limited to, the File system in Userspace (FUSE) to expose file system calls from the operating system kernel as function callbacks in user space. The DBFS Client 112 then transforms the function callbacks to the equivalent database interfaces provided by the DBFS Content API and sends the database call to the DBMS 120. Client-user file system requests that are related to the files within the DBFS file system are then converted by the operations described above.

The network 130 may be implemented with any type of medium and/or mechanism that facilitates the exchange of information between the client device 110 and the DBMS 120. Furthermore, the network 130 may facilitate use of any type of communications protocol, and may be secured or unsecured, depending upon the requirements of a particular embodiment.

Database Query

Users interact with a database server on the DBMS by submitting a database command that causes the database server to perform operations on data stored in the database. A user may be one or more applications running on a client computer that interact with the database server. As used herein, "database query" refers to a database command and may be in the form of a database statement that conforms to a database language. In an embodiment, a database language for expressing the database query is the Structured Query Language (SQL). There are many different versions of SQL, some versions are standard and some proprietary, and there are a variety of extensions.

The DBFS Content API is used to translate client operating system file operation requests into their corresponding database query. In an embodiment, client operating system file operation requests that include a request for file version information can be accommodated provided that the DBMS supports database object archiving. In an embodiment, the DBMS may enable database object archiving by using a transaction-based archiving mechanism such as a Flashback Data Archive. A transaction-based archiving mechanism provides the ability to track and store transactional changes to database objects over a specified period of times. Transactional changes to database objects are stored in one or more specific tables in a historical data tablespace. An example of a transaction-based archiving mechanism is described in the FLASHBACK DATA OVERVIEW section below. In a transaction-based archiving mechanism, the one or more historical data tables may be queried using a database query called a flashback query. A flashback query is a database query that allows a user to view the state of one or more database objects at a particular point in time in the past, where the point of time is specified either within the query or by the query context within which the query is executed. An example of a query context that specifies the particular point of time is a session context variable that specifies a flashback time. Other embodiments may implement different types of transaction-based archiving mechanisms on the DBMS.

In an embodiment, a flashback query related to a file operation request may be augmented to the original file operation request database query. In this context, the database objects may refer to files and directories stored in the DBFS. By retrieving file version information, using flashback queries, for the specific file requested, the client is able to view and track the changes made to the specific file over a period of time.

In an embodiment, flashback queries use a time-specifying parameter that specify a particular time that can be compared to a timestamp associated with a past version of data. In another embodiment, the time specifying parameter may be a system change number (SCN) associated with a past completed transaction.

Figure 2:
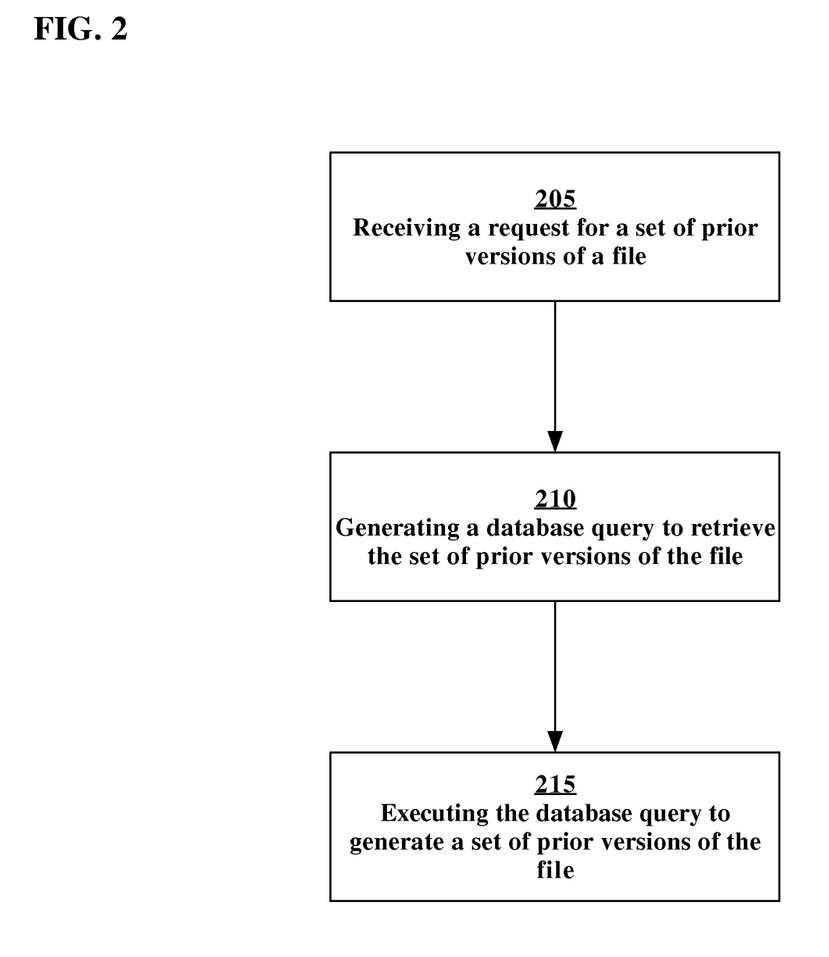
FIG. 2 is a flow diagram of the method by which the database file system determines a set of prior versions of the data file stored within the database management system.

FIG. 2 depicts an embodiment of a flow diagram of the method by which the database file system determines a set of prior versions of the specific file stored within the DBFS. At step 205 the DBMS receives a file operation request as well as a request for a set of prior versions of files associated with the file operation request. For example, if the file operation request is a request to list information about the files in directory A, then a prior versions request would be for the set of prior versions of the files in directory A.

At step 210, the DBMS generates a flashback query to retrieve the prior versions associated with the received file operation request. Using the current example of a directory listing request on directory A, the generation step at 210 may augment the current database query for files in directory A to include a flashback query on the historical data tables for metadata associated with prior versions of files within directory A. In another embodiment, step 210 may result in a separate flashback query on the historical data tables, joining the result set from the original database query for files in directory A.

At step 215, the DBMS executes the generated database query that includes the flashback query to generate a set of prior versions for the files from the original query. When the original file operation database query results in a result set of multiple files. The flashback query will generate multiple sets of file versions that correspond to each file in the original result set.

Figure 3:
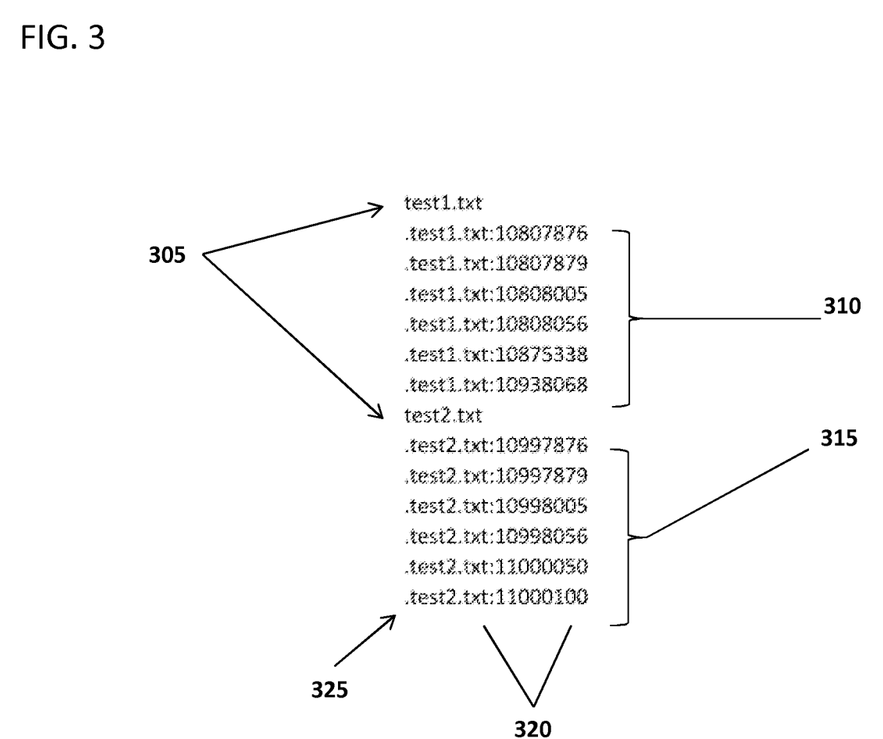
FIG. 3 is an embodiment of a client display of the set of prior versions of a specific data file stored within the database.

FIG. 3 depicts a result set of a file operation request and a result set of file versions of the original request to list of the files in directory A. Current files 305 are the result set of the original file operation request for a list of the files in directory A. Current files 305 include files test1.txt and test2.txt. Test1 version files 310 is a result set of the flashback query associated with test1.txt. Within Test1 version files 310 there are 6 representations of prior states of the file test1.txt stored in the Flashback Data Archive. Test2 version files 315 is a result set of the flashback query associated with test2.txt.

In an embodiment, the result sets for Test1 version files 310 and Test2 version files 315 may append a specific identifier to each version representation so as to differentiate the different versions of the database object from one another. Identifier 320 is the specific SCN number associated with the completed transaction in a previous point in time. Another embodiment may use a different identifier, such as a time stamp to differentiate the different versions of the database object.

In an embodiment, previous versions of a file may be marked with a flag so as to denote that these versions of the file are not the current version of the file. In FIG. 3 flag 325 is used to denote a previous version. Flag 325 is a "dot" that is pre-pended to the name of the file. In several operating systems, such as Linux, a file that begins with a "dot" is marked as hidden. By using a pre-pended dot, the user is not directly aware of the previous versions unless the user specifically displays the hidden files; therefore the user is less likely to mistakenly assume a previous version of a file is the current version. In an embodiment, denoting past versions of files as hidden is configurable and other embodiments may use different symbols to convey the previous version flag.

In an embodiment, previous versions of a file may be viewed by the user. For example, if the user requests to view a previous version of a file, the client operating system request would be translated into a database query for that current version of the file and then a flashback query would be generated to create the specified version the user has requested. In an embodiment, the user would only have read-only access to the file because the previous version of the file only exists in the form of undo records in the historical data tablespace. If the user wanted to save the previous version or alter a previous version, then the user would have to create a new file using the previous version's data. By doing so, the user would be creating a new row in the database that corresponds to the previous version of the file and any changes made to that version. This new version of the file would not have any affect on the current version of the original file.

In an embodiment, retrieving archive information and archived files from the DBFS is configurable to the tables within the DBFS. A database administrator may be able to configure which tables are archived and which tables are not. The length of time for maintaining archived versions of files are configurable.

Flashback Data Overview

Transaction-based archiving technology provides a set of functionality to access data as of a time in the past and recover from technical or human errors. Flashback technology supports recovery at various levels of granularity including the row, transaction, table and database wide. A DBMS manages multi-versioning of database objects by keeping undo records of transactional changes to database objects. When SQL operations such as insert, update, or delete happen on data, the DBMS writes the data into an undo tablespace that is used for transaction rollbacks. The undo tablespace may hold undo records for a specified amount of time or based on the size of the undo tablespace.

An undo record is a record of the state of a database object just before a change to the database object is committed. For example, if a user commits an update transaction on row X, then the DBMS will first make a copy of row X and place it into the undo tablespace before committing the user's update to row X. By doing so, the DBMS is able to retrieve the previous state of row X, prior to the committed update, by simply accessing the undo tablespace.

A transaction-based archiving mechanism, such as Flashback Data Archive utilizes the undo records by archiving them into a historical data tablespace. A difference between the undo tablespace and the Flashback Data Archive is that the Flashback Data Archive is not limited by the size of the undo tablespace. Database tables can be marked for archiving within the Flashback Data Archive. Once marked for archival, previous versions of the data can be queried using a flashback query.

DBFS Overview

A DBFS file system creates a standard file system interface on top of files and directories that are stored in database tables. A set of database procedures implement the file system access primitives such as create, open, read, write, and list directory. A DBFS Client provides an interface for a remote client machine that transforms file system operations from the remote client into their corresponding database operation requests. The DBFS Client mounts on a client machine at a specific point the DBFS file system. Before mounting the DBFS file system on the client machine, the DBFS Client authenticates a client-user based on their database credentials. Once authorized, the DBMS transmits information for each of the requested files stored in the DBFS file system.

When the client-user performs a file operation request on a file stored within the DBFS file system, the following operations occur. The client machine determines whether the client-user has sufficient privileges to perform the requested file operation. This determination is performed by the client machine's operating system. If the client-user has sufficient privileges, then the client's operating system passes the request to the DBFS Client. The DBFS Client then translates the client-user's operating system file operation request into a database request. The database request is passed to the DBMS, which performs the database request. The user then receives the output of the database request via the DBMS, and DBFS client.

DBMS Overview

Embodiments of the present invention are used in the context of DBMSs. Therefore, a description of a DBMS is useful.

A DBMS 120 manages a database. The DBMS 120 may comprise one or more database servers 122. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server 122 of a DBMS 120 by submitting to the database server 122 commands that cause the database server to perform operations on data stored in a database. A user may be one or more applications running on a client computer that interact with a database server 122. Multiple users may also be referred to herein collectively as a user.

A database command may be in the form of a database statement that conforms to a database language. A database language for expressing the database commands is SQL. There are many different versions of SQL, some versions are standard and some proprietary, and there are a variety of extensions. DDL commands are issued to a database server 122 to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server 122. A server, such as a database server 122, is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data.

The database dictionary is modified according to DDL commands issued to add, modify, or delete database objects. For example, in response to receiving a DDL statement to create table person, a database server alters metadata in a database dictionary to define table and its columns. A database dictionary is referred to by a DBMS 120 to determine how to execute database commands submitted to a DBMS 120. Thus, when a DML statement is received by a database server 122 to insert rows with a value in a sparse column, the database server 122 consults the database dictionary to determine that the column is sparse and stores that values.

A DBMS 120 receives queries issued against a database object managed by a database system. A query optimizer associated with the database system may generate one or more different candidate execution plans for a query, which are evaluated by the query optimizer to determine which execution plan should be used to compute the query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
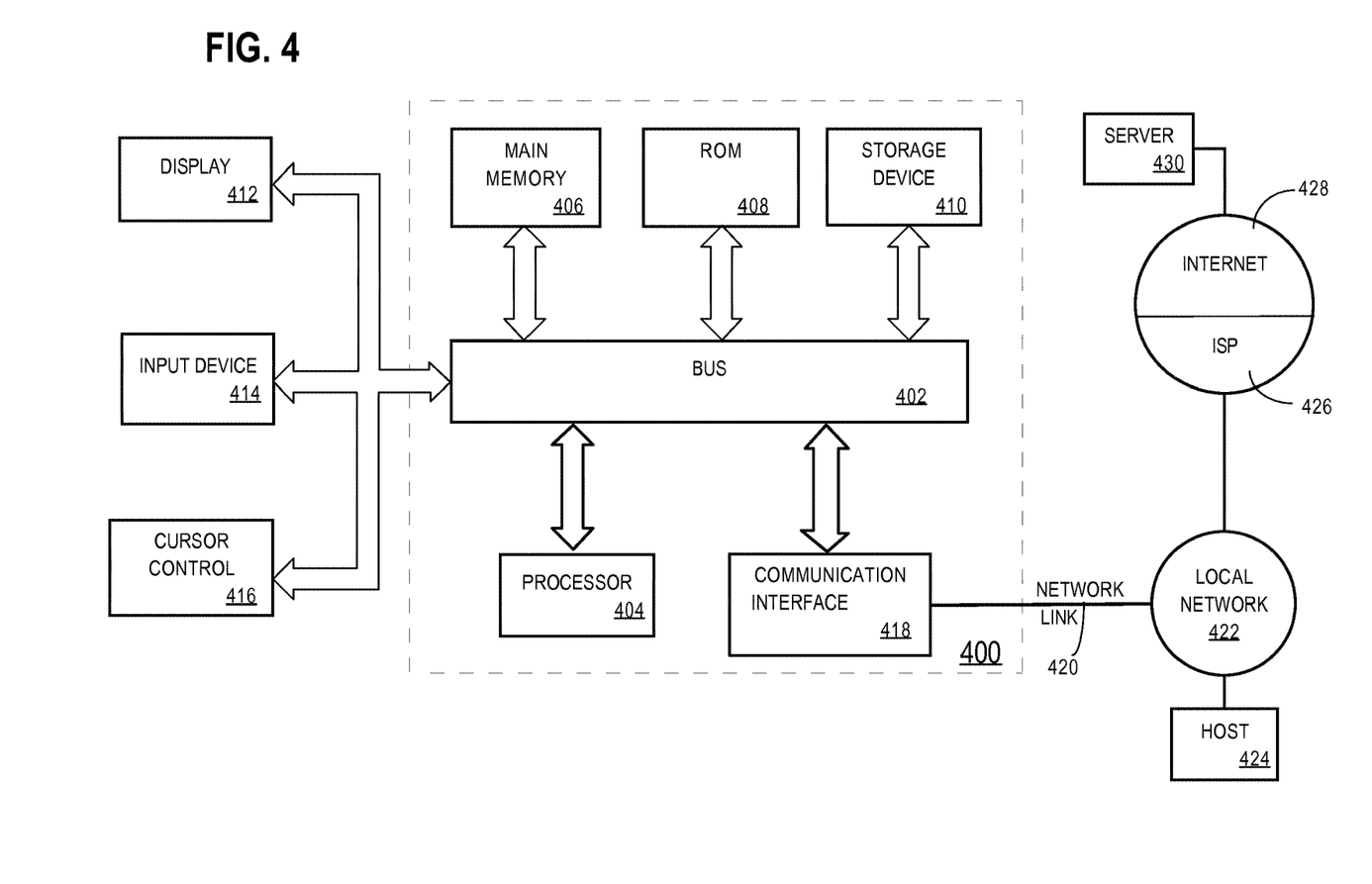
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Benefits of Certain Embodiments

In an embodiment, a solution as described herein improves the ability to view and track changes on files and folders stored in a database file system. Current access to prior versions of files stored in a database file system require generating a separate query request from the original file operation request. By having to create separate individual requests for version information on each file, a user is faced with a laborious task of manually querying prior states of a file.

This solution automates the task of querying previous versions of a file by incorporating the version request into the original file operation request. By incorporating the version request into the original file operation request, the user can be presented with a full account to a file and its previous states in time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
accessing a plurality of files stored in a database table through an application programming interface (API) that supports access primitives, said access primitives including creating a file, opening a file, and reading a file,
wherein said database table is stored in a database managed by a database server,
wherein said files include a particular file;
in response to executing database transactions that make changes to the particular file, storing undo records in an undo tablespace in the database, said undo records recording information usable to undo said changes;
archiving said undo records into a historical data tablespace in the database;
receiving a file operation request to perform on the particular file;
in response to receiving said file operation request:
generating a particular database query that conforms to SQL ("Structure Query Language") to generate a set of version identifiers for the particular file, the particular database query being executable on the historical data tablespace with respect to a point in time in the past, said point in time being specified by a session context variable or as a parameter specified by the particular database query; and executing the particular database query thereby generating said set of version identifiers of the particular file, each version identifier of said set of version identifiers identifying a respective version of said particular file.

2. The method of claim 1, wherein generating a set of version identifiers of the particular file further comprises using a transaction-based archiving mechanism to generate a set of versions of the particular file.

3. The method of claim 1, wherein generating a set of version identifiers of the particular file further comprises generating a non-current version of the particular file with a version identifier.

4. The method of claim 1, wherein generating a set of version identifiers of the particular file further comprises generating a non-current version of the particular file as a read-only version of the particular file.

5. The method of claim 1, the method further comprising:
allowing a client to read a non-current version of the particular file; and
denying an update request on the non-current version of the particular file from the client.

6. The method of claim 1, wherein generating a set of version identifiers of the particular file is configurable based upon a specified time range.

7. The method of claim 1, wherein generating a set of version identifiers of the particular file is configurable for each database table within the database.

8. A system, the system comprising:
a memory;
one or more processors comprising a database management system configured to:
accessing a plurality of files stored in a database table through an application programming interface (API) that supports access primitives, said access primitives including creating a file, opening a file, and reading a file,
wherein said database table is stored in a database managed by the database management system,
wherein said files include a particular file;
in response to executing database transactions that make changes to the particular file, storing undo records in an undo tablespace in the database, said undo records recording information usable to undo said changes;
archiving said undo records into a historical data tablespace in the database;
receiving a file operation request to perform on the particular file;
in response to receiving said file operation request:
generating a particular database query that conforms to SQL ("Structure Query Language") to generate a set of version identifiers for the particular file, the particular database query being executable on the historical data tablespace with respect to a point in time in the past, said point in time being specified by a session context variable or as a parameter specified by the particular database query; and
executing the particular database query thereby generating said set of version identifiers of the particular file, each version identifier of said set of version identifiers identifying a respective version of said particular file.

9. The system of claim 8, wherein the database management system configured to execute said particular database query thereby generating a set of version identifiers of the particular file further comprises using a transaction-based archiving mechanism to generate a set of versions of the particular file.

10. The system of claim 8, wherein the database management system configured to execute said particular database query thereby generating a set of version identifiers of the particular file further comprises generating a non-current version of the particular file with a version identifier.

11. The system of claim 8, wherein the database management system configured to execute said particular database query thereby generating a set of version identifiers of the particular file further comprises generating a non-current version of the particular file as a read-only version of the particular file.

12. The system of claim 8, the system further comprising:
the database management system configured to allow a client to read a non-current version of the particular file; and
the database management system configured to deny an update request on the non-current version of the particular file from the client.

13. The system of claim 8, wherein the database management system configured to execute said particular database query thereby generating a set of version identifiers of the particular file is configurable based upon a specified time range.

14. The system of claim 8, wherein the database management system configured to execute said particular database query thereby generating a set of version identifiers of the particular file is configurable for each database table within the database.

15. One or more non-transitory computer-readable storage media storing instructions which, when executed by one or more computing devices, cause performance of a method comprising the steps of:
accessing a plurality of files stored in a database table through an application programming interface (API) that supports access primitives, said access primitives including creating a file, opening a file, and reading a file,
wherein said database table is stored in a database managed by a database server,
wherein said files include a particular file;
in response to executing database transactions that make changes to the particular file, storing undo records in an undo tablespace in the database, said undo records recording information usable to undo said changes;
archiving said undo records into a historical data tablespace in the database;
receiving a file operation request to perform on the particular file;
in response to receiving said file operation request:
generating a particular database query that conforms to SQL ("Structure Query Language") to generate a set of version identifiers for the particular file, the particular database query being executable on the historical data tablespace with respect to a point in time in the past, said point of time being specified by a session context variable or as a parameter specified by the particular database query; and
executing the particular database query thereby generating said set of version identifiers of the particular file, each version identifier of said set of version identifiers identifying a respective version of said particular file.

16. The one or more non-transitory computer-readable storage media of claim 15, wherein generating a set of version identifiers of the particular file further comprises using a transaction-based archiving mechanism to generate a set of versions of the particular file.

17. The one or more non-transitory computer-readable storage media of claim 15, wherein generating a set of version identifiers of the particular file further comprises generating a non-current version of the particular file with a version identifier.

18. The one or more non-transitory computer-readable storage media of claim 15, wherein generating a set of version identifiers of the particular file further comprises generating a non-current version of the particular file as a read-only version of the particular file.

19. The one or more non-transitory computer-readable storage media of claim 15, the method further comprising the steps of:
   allowing a client to read a non-current version of the particular file; and
   denying an update request on the non-current version of the particular file from the client.

20. The one or more non-transitory computer-readable storage media of claim 15, wherein generating a set of version identifiers of the particular file is configurable based upon a specified time range.

21. The one or more non-transitory computer-readable storage media of claim 15, wherein generating a set of version identifiers of the particular file is configurable for each database table within the database.

\* \* \* \* \*